United States Patent
He et al.

(10) Patent No.: US 11,832,090 B2
(45) Date of Patent: Nov. 28, 2023

(54) DATA TRANSMISSION METHOD, DEVICE, AND STORAGE MEDIUM

(71) Applicant: GUANGDONG OPPO MOBILE TELECOMMUNICATIONS CORP., LTD., Guangdong (CN)

(72) Inventors: Chuanfeng He, Dongguan (CN); Zuomin Wu, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/699,851

(22) Filed: Mar. 21, 2022

(65) Prior Publication Data

US 2022/0210680 A1    Jun. 30, 2022

Related U.S. Application Data

(63) Continuation of application No. 17/323,805, filed on May 18, 2021, now Pat. No. 11,304,079, which is a continuation of application No. PCT/CN2019/087470, filed on May 17, 2019.

(51) Int. Cl.
- *H04W 24/08* (2009.01)
- *H04W 72/04* (2023.01)
- *H04W 72/0446* (2023.01)
- *H04W 72/23* (2023.01)

(52) U.S. Cl.
CPC ....... *H04W 24/08* (2013.01); *H04W 72/0446* (2013.01); *H04W 72/23* (2023.01)

(58) Field of Classification Search
CPC .. H04W 24/08; H04W 72/23; H04W 72/0446
See application file for complete search history.

(56) References Cited

U.S. PATENT DOCUMENTS

2021/0243763 A1    8/2021   Zhou et al.

FOREIGN PATENT DOCUMENTS

| CN | 108271430   | A  | 7/2018  |
|----|-------------|----|---------|
| CN | 108632960   | A  | 10/2018 |
| CN | 109314866   | A  | 2/2019  |
| CN | 109644504   | A  | 4/2019  |
| EP | 3439222     | A2 | 2/2019  |
| KR | 20160037766 | A  | 4/2016  |
| WO | 2016071741  | A1 | 5/2016  |
| WO | 2018224815  | A1 | 12/2018 |

(Continued)

OTHER PUBLICATIONS

Examination Report for European Application No. 19929639.3 dated Sep. 9, 2022. 9 pages.

(Continued)

*Primary Examiner* — Melvin C Marcelo
(74) *Attorney, Agent, or Firm* — PERKINS COIE LLP

(57) ABSTRACT

A data transmission method, a device and a storage medium are provided, and relate to the technical field of mobile communication. The method includes: monitoring a first physical downlink control channel (PDCCH) according to a first PDCCH monitoring mode; and determining, according to a monitoring result of the first PDCCH and first time information, ending time of monitoring the first PDCCH according to the first PDCCH monitoring mode.

20 Claims, 6 Drawing Sheets

(56) References Cited

FOREIGN PATENT DOCUMENTS

WO 2020217513 A1 10/2020

OTHER PUBLICATIONS

Examiner's Report for Canadian Application No. 3124466 dated Aug. 31, 2022. 5 pages.
Notice of Allowance for Korean Application No. 2021-7018453 dated Aug. 24, 2022. 3 pages with English translation.
Examination Report for Indian Application No. 202127022443 dated May 24, 2022. 5 pages with English translation.
Notice of Reasons for Refusal for Japanese Application No. 2021-534913 dated Jul. 5, 2022. 10 pages with English translation.
Reddy, P.M., et al., Downlink Control Channel Scheduling for 3GPP Narrowband-IoT—2018 IEEE 29th Annual International Symposium on Personal, Indoor, and Mobile Radio Communications (PIMRC) (7 pages).
CNIPA, First Office Action for Chinese Application No. 202010705926.6. dated Sep. 2, 2021. 13 pages with English translation.
MediaTek Inc. "DL Signals and Channels for NR-U Operation" R1-1906541; 3GPP TSG RAN WG1 #97; Reno, USA; May 13-17, 2019; 6 pages.
Decision of Rejection for Chinese Application No. 2020107059266 dated Jan. 13, 2022. 10 pages with English translation.
ETRI "DL signals and channels for NR-U" R1-1907035; 3GPP TSG RAN WG1 Meeting #97; May 13-17, 2019. 5 pages.
Extended European Search Report for European Application No. 19929639.3 dated Nov. 25, 2021. 8 pages.
International Search Report dated Feb. 14, 2020 of PCT/CN2019/087470 (4 pages).
Qualcomm Incorporated "DL signals and channels for NR-U" R1-1904997; 3GPP TSG RAN WG1 Meeting #96b; Xi'an, China; Apr. 8-12, 2019. 10 pages.
Notification of Reason for Refusal dated Mar. 7, 2022 with English translation, in Korean Application No. 10-2021-7018453 , 12 pages.
Decision of Refusal for Japanese Application No. 2021-534913 dated Jan. 13, 2023. 8 pages with English translation.
Examination Report for European Application No. 19929639.3 dated Feb. 6, 2023. 9 pages.
Examination Report of the EP application No. 19929639.3, dated Jun. 14, 2023. 8 pages.
First Examination Report of Vietnamese application No. 1-2021-04307 dated Aug. 14, 2023, 4 pages.
Second Examiner's Report of Canadian application No. 3124466 dated Sep. 13, 2023, 4 pages.

DATA TRANSMISSION METHOD, DEVICE, AND STORAGE MEDIUM

CROSS-REFERENCE TO RELATED APPLICATION

This application is a continuation application of U.S. application Ser. No. 17/323,805 filed on May 18, 2021, which is a continuation application of International PCT Application No. PCT/CN2019/087470 filed on May 17, 2019, the entire contents of both are hereby incorporated by reference.

TECHNICAL FIELD

The present disclosure relates to the technical field of mobile communication, in particular to a data transmission method, a device and a storage medium.

BACKGROUND

An unlicensed spectrum is a kind of shared spectrum. In order to make each communication device coexist amicably on unlicensed spectrum, some countries or regions stipulate the legal requirements that need to be met when using the unlicensed spectrum. For example, it is necessary to follow the principle of monitoring before using, and the period of the transmission should not exceed the maximum occupation time of the channel in one data transmission, so as to realize the data transmission.

After preempting a channel through monitoring, an access network device sends, using a PDCCH (Physical Downlink Control CHannel), indication information of COT (Channel Occupation Time) including COT starting time, COT ending time, the number of time slots in COT, etc. Then, the access network device sends scheduling information using the PDCCH. Generally, UE (User Equipment) monitors the PDCCH in a PDCCH monitoring mode with a small monitoring time occasion interval so as to listen to COT indication information. After the COT indication information is monitored, the UE enters into another channel receiving phase according to the COT indication information. In other words, from the starting position of the first time slot after the COT starting time to the COT ending time, the UE monitors the PDCCH by using a PDCCH monitoring mode with a large monitoring time occasion interval, so as to receive the scheduling information sent by the access network device, thereby receiving data according to the scheduling information. In addition, when the monitoring time reaches the ending time of COT, the UE is switched back occasion to monitor the PDCCH in a PDCCH monitoring mode with a smaller monitoring time interval.

However, no matter which PDCCH monitoring mode is currently used by the UE to monitor a PDCCH, when the UE has not detected COT indication information, it will always use the current PDCCH monitoring mode to monitor, that is, it will never be switched to other phases for receiving a channel. This results in the failure of data transmission between the access network device and the UE.

SUMMARY

Implementations of the present disclosure provide a data transmission method, a device, and a storage medium.

In one aspect, a data transmission method is provided, which is applied to UE, and the method includes: monitoring a first physical downlink control channel (PDCCH) according to a first PDCCH monitoring mode; and determining, according to a monitoring result of the first PDCCH and first time information, ending time of monitoring the first PDCCH according to the first PDCCH monitoring mode.

In a possible implementation of the present disclosure, the first time information includes first period, and the first period is determined by received first configuration information or predefined.

In a possible implementation of the present disclosure, a starting point of the first period is determined by target monitoring occasion for monitoring the first PDCCH according to the first PDCCH monitoring mode, wherein the first PDCCH carrying a common DCI is not detected or the first PDCCH carrying a target DCI is detected at the target monitoring occasion.

In a possible implementation of the present disclosure, the method further includes: acquiring a target DCI carried by the first PDCCH when the first PDCCH is detected by the first PDCCH monitoring mode; and determining the first time information according to the target DCI.

In a possible implementation of the present disclosure, determining the first time information according to the target DCI includes: determining the first time information according to scheduling information when the target DCI is used for scheduling data, wherein the scheduling information is carried by the target DCI or determined by the received second configuration information.

In a possible implementation of the present disclosure, when the target DCI is used for scheduling a physical downlink shared channel (PDSCH), determining the first time information according to scheduling information includes: acquiring a first parameter value indicating the number of time slots between a PDCCH and a PDSCH and a second parameter value indicating the number of time slots between a PDSCH and a physical uplink control channel (PUCCH) in the scheduling information; and determining the first time information according to the first parameter value and the second parameter value.

In a possible implementation of the present disclosure, when the target DCI is used for scheduling a physical uplink shared channel (PUSCH), determining the first time information according to scheduling information includes: acquiring a third parameter value used for indicating the number of offset time slots between a time slot where the target DCI is located and a time slot where PUSCH is located in the scheduling information; and determining the first time information according to the third parameter value.

In a possible implementation of the present disclosure, determining the first time information according to the target DCI includes: determining the first time information according to indication information in the target DCI.

In a possible implementation of the present disclosure, the indication information is second period, the second period is used for determining the first time information, and the second period is any one of at least one second period predefined.

In a possible implementation of the present disclosure, determining, according to the monitoring result of the first PDCCH and the first time information, the ending time of monitoring the first PDCCH according to the first PDCCH monitoring mode, includes: when the first time information is used for indicating a first moment, if channel occupation time (COT) indication information is not received on the first PDCCH when the first moment arrives, determining that the first moment is the ending time of monitoring the first PDCCH according to the first PDCCH monitoring mode.

In a possible implementation of the present disclosure, the method further includes: monitoring a second PDCCH according to a second PDCCH monitoring mode after the ending time of monitoring the first PDCCH according to the first PDCCH monitoring mode.

In another aspect, a device is provided, the device includes a processor and a memory, the memory stores at least one instruction, and the at least one instruction is used for being executed by the processor to implement any of the data transmission method described in the above one aspect.

In another aspect, a computer-readable storage medium is provided, and the computer-readable storage medium stores an instruction, when executed by a processor, enabling the processor to implement any of the data transmission method described in the above one aspect.

In another aspect, a computer program product including an instruction is provided. The computer program product, when running on a computer, causes the computer to execute any of the data transmission method described in above one aspect.

In another aspect, a data transmission method is provided, applied to UE, and the method includes: monitoring a demodulation reference signal (DMRS); and determining, according to a monitoring result of the DMRS and second time information, ending time of monitoring a first PDCCH according to a first PDCCH monitoring mode.

In a possible implementation of the present disclosure, the second time information is determined by received third configuration information or predefined.

In a possible implementation of the present disclosure, determining, according to the monitoring result of the DMRS and the second time information, the ending time of monitoring the first PDCCH according to the first PDCCH monitoring mode, includes: when the second time information is used for indicating a second moment, if the DMRS is detected, determining that the second moment is the ending time of monitoring the first PDCCH according to the first PDCCH monitoring mode.

In a possible implementation of the present disclosure, the method further includes: monitoring a DMRS according to a target monitoring mode after the ending time of monitoring the first PDCCH according to the first PDCCH monitoring mode.

In another aspect, a device is provided, the device includes a processor and a memory, the memory stores at least one instruction, and the at least one instruction is used for being executed by the processor to implement any of the data transmission method described in the above another aspect.

In another aspect, a computer-readable storage medium is provided, and the computer-readable storage medium stores an instruction, when executed by a processor, enabling the processor to implement any of the data transmission method described in the above another aspect.

In another aspect, a computer program product including an instruction is provided. The computer program product, when running on a computer, causes the computer to execute any of the data transmission method described in the above another aspect.

In another aspect, an apparatus of data transmission configured in UE is provided, and the method includes: a first monitoring module and a first determining module.

The first monitoring module is configured to monitor a first physical downlink control channel (PDCCH) according to a first PDCCH monitoring mode.

The first determining module is configured to determine, according to a monitoring result of the first PDCCH and first time information, ending time of monitoring the first PDCCH according to the first PDCCH monitoring mode.

In a possible implementation of the present disclosure, the first time information includes first period, and the first period is determined by received first configuration information or predefined.

In a possible implementation of the present disclosure, a starting point of the first period is determined by target monitoring occasion for monitoring the first PDCCH according to the first PDCCH monitoring mode, wherein the first PDCCH carrying a common DCI is not detected or the first PDCCH carrying a target DCI is detected at the target monitoring occasion.

In a possible implementation of the present disclosure, the first determining module is further configured to: acquire a target DCI carried by the first PDCCH when the first PDCCH is detected by the first PDCCH monitoring mode; and determine the first time information according to the target DCI.

In a possible implementation of the present disclosure, the first determining module is configured to: determining the first time information according to scheduling information when the target DCI is used for scheduling data, wherein the scheduling information is carried by the target DCI or determined by the received second configuration information.

In a possible implementation of the present disclosure, the first determining module is configured to: when the target DCI is used for scheduling a physical downlink shared channel (PDSCH), acquire a first parameter value indicating the number of time slots between a PDCCH and a PDSCH and a second parameter value indicating the number of time slots between a PDSCH and a physical uplink control channel (PUCCH) in the scheduling information; and determine the first time information according to the first parameter value and the second parameter value.

In a possible implementation of the present disclosure, the first determining module is configured to: when the target DCI is used for scheduling a physical uplink shared channel (PUSCH), acquire a third parameter value used for indicating the number of offset time slots between a time slot where the target DCI is located and a time slot where PUSCH is located in the scheduling information; and determine the first time information according to the third parameter value.

In a possible implementation of the present disclosure, the first determining module is configured to: determine the first time information according to indication information in the target DCI.

In a possible implementation of the present disclosure, the indication information is second period, the second period is used for determining the first time information, and the second period is any one of at least one period predefined.

In a possible implementation of the present disclosure, the first determining module is configured to: when the first time information is used for indicating a first moment, if channel occupation time (COT) indication information is not received on the first PDCCH when the first moment arrives, determine that the first moment is the ending time of monitoring the first PDCCH according to the first PDCCH monitoring mode.

In a possible implementation of the present disclosure, the first monitoring module is further configured to: monitor a second PDCCH according to a second PDCCH monitoring mode after the ending time of monitoring the first PDCCH according to the first PDCCH monitoring mode.

In another aspect, an apparatus of data transmission configured in UE is provided, and the method includes: a second monitoring module and a second determining module.

The second monitoring module is configured to monitor a demodulation reference signal (DMRS).

The second determining module is configured to determine, according to a monitoring result of the DMRS and second time information, ending time of monitoring a first PDCCH according to a first PDCCH monitoring mode.

In a possible implementation of the present disclosure, the second time information is determined by received third configuration information or predefined.

In a possible implementation of the present disclosure, the second determining module is configured to: when the second time information is used for indicating a second moment, if the DMRS is detected, determine that the second moment is the ending time of monitoring the first PDCCH according to the first PDCCH monitoring mode.

In a possible implementation of the present disclosure, the second monitoring module is further configured to: monitor a DMRS according to a target monitoring mode after the ending time of monitoring the first PDCCH according to the first PDCCH monitoring mode.

BRIEF DESCRIPTION OF DRAWINGS

To describe technical solutions in implementations of the present disclosure more clearly, drawings that need to be used in the description of the implementations will be briefly introduced below. It is apparent that the drawings described below are only some implementations of the present disclosure, and for those of ordinary skill in the art, other drawings may be obtained according to these drawings without paying an inventive effort.

DETAILED DESCRIPTION

Before introducing a data transmission method provided by an implementation of the present disclosure in detail, terms, implementation environment and application scenarios related to the implementation of the present disclosure are first introduced.

First, the terms related to the implementations of the present disclosure are introduced.

Unlicensed Spectrum: an unlicensed spectrum is generally considered as a shared spectrum. In other words, communication devices in different communication systems can use the unlicensed spectrum as long as they meet the regulatory requirements set by countries or regions on the unlicensed spectrum, without applying for exclusive spectrum authorization from the government.

PDCCH: a PDCCH is a set of physical resource particles, which can be used for carrying DCI (Downlink Control Information) and COT indication information. According to its different functional fields, control information carried in a PDCCH channel includes common control information and dedicated control information.

Search Space: a search space defines a starting position of UE blind monitoring and the search mode of a PDCCH.

Control Resource Set (CORESET): a control resource set is a kind of time-frequency resource set, and UE performs PDCCH monitoring on the corresponding control resource set. A control resource set consists of a set of REGs (Resource Element Groups).

Secondly, implementation environment related to an implementation of the present disclosure is briefly introduced.

Figure 1:
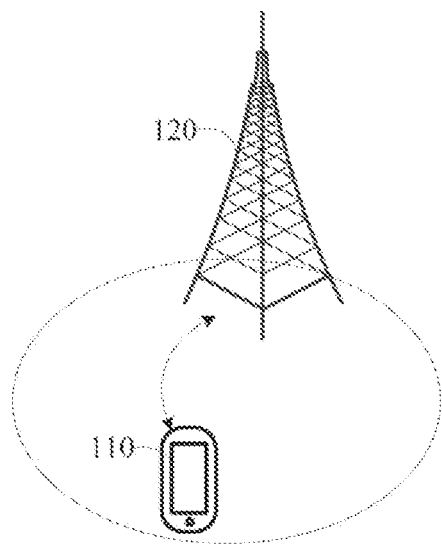
FIG. 1 is a schematic diagram of implementation environment according to an exemplary implementation of the present disclosure.

Please refer to FIG. 1, FIG. 1 is a schematic diagram of implementation environment according to an exemplary implementation. A data transmission method provided by an implementation of the present disclosure can be applied to the implementation environment shown in FIG. 1. The implementation environment mainly includes UE 110 and an access network device 120. The communication between the UE 110 and the access network device 120 can be realized using a mobile communication network.

The access network device 120 can be used for PDCCH channel transmission. Exemplarily, the access network device 120 may send information for data scheduling on the PDCCH channel to indicate how the UE 110 performs data transmission of context. As an example, in the NR (New Radio) system, the access network device may be an eNB (evolutional Node B), etc., which is not limited in the implementation of the present disclosure.

The UE 110 is mainly used for executing the data transmission method provided in the implementation of the present disclosure. For example, the UE may be used for monitoring a PDCCH according to a PDCCH monitoring mode configured by the access network device 120 and receiving scheduling data transmitted by the PDCCH, so as to realize context data transmission.

Next, the application scenario related to the implementation of the present disclosure is briefly introduced.

The data transmission method provided by the implementation of the present disclosure is applied to a channel scene of an unlicensed spectrum. In order to make each communication system using an unlicensed spectrum for wireless communication coexist amicably on the unlicensed spectrum, some countries or regions have stipulated the legal requirements that must be met when using the unlicensed spectrum. For example, the principle of "LBT" (Listen-Before-Talk) needs to be followed, that is, a communication device needs to listen to a channel first before sending signals on an unlicensed spectrum channel Only when the channel monitoring result is that the channel is idle, the communication device can send signals. If the channel monitoring result of the communication device on the channel of the unlicensed spectrum is that the channel is busy, the communication device cannot perform signal transmission. In addition, in order to ensure fairness, in one transmission, the period of signal transmission by the communication device using the unlicensed spectrum channel cannot exceed MCOT (Maximum Channel Occupation Time).

Figure 2:
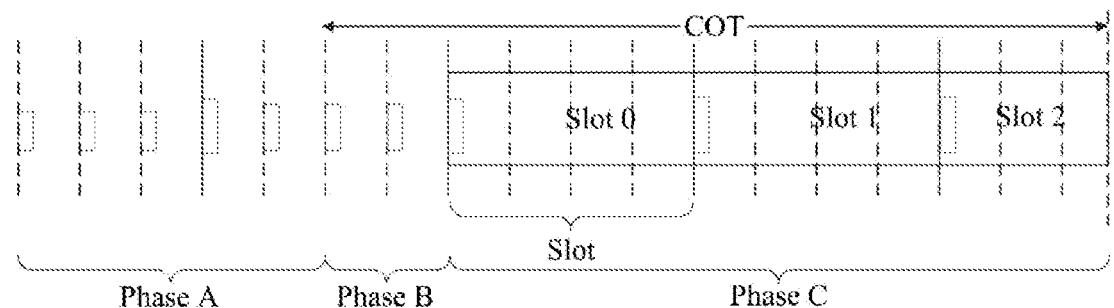
FIG. 2 is a schematic diagram of phases where UE receives a channel according to an exemplary implementation of the present disclosure.

Herein, the access network device can perform channel transmission after successfully preempting a channel. For UE, the reception of a downlink channel generally includes three phases: Phase A, Phase B and Phase C, and channel monitoring opportunities in different phases may be different. As shown in FIG. 2, next, the three phases are briefly introduced respectively:

Phase A: At this phase, in order to obtain COT indication information as soon as possible, UE will generally listen to a PDCCH at a monitoring occasion with a small interval. For example, the mini-slot based monitoring occasion may be used for monitoring, that is, the monitoring period is less than one slot.

Phase B: When the UE detects the COT indication information, it can be determined that the access network device is in the COT. As shown in FIG. 2, the phase from the COT to the starting position of the first time slot is Phase B. As an example, in Phase B, the UE can continue to use the PDCCH monitoring mode of Phase A to monitor the PDCCH, which is not limited here.

Phase C: Phase C refers to the starting position of the first time slot in the COT to the end of the COT. In this Phase C, the UE listens to the PDCCH at a monitoring occasion with a long interval. For example, the slot based monitoring occasion may be used for monitoring, that is, the monitoring period is greater than or equal to one time slot. In addition, at this phase, the UE receives the scheduling information sent by the access network device, so as to perform uplink and downlink data transmission.

Therefore, UE needs to determine the timing of switching from one phase to another according to the COT indication information. However, if the UE misses monitoring the COT indication information, it cannot normally enter other channel monitoring phases, for example, it cannot enter Phase A from Phase C. Therefore, an implementation of the present disclosure provides a data transmission method. The method can solve this problem. Please refer to the following implementations for specific implementation.

After introducing the application scenarios and implementation environments related to the implementations of the present disclosure, the data transmission method provided by the implementation of the present disclosure will be described in detail with reference to the attached drawings.

Figure 3:
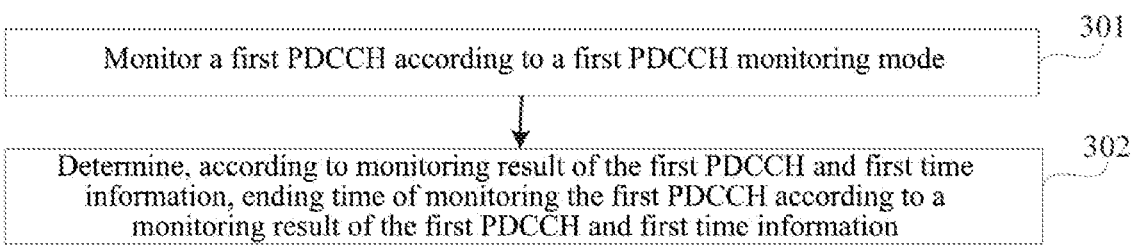
FIG. 3 is a flowchart of a data transmission method according to an exemplary implementation of the present disclosure.

Please refer to FIG. 3, which is a flow chart of a data transmission method according to an exemplary implementation. The data transmission method can be applied to the implementation environment shown in FIG. 1, and the data transmission method can include the following implementation acts: act 301 and act 302.

In act 301, a first PDCCH is monitored according to a first PDCCH monitoring mode.

As an example, a PDCCH monitoring period of a search space corresponding to the first PDCCH monitoring mode is greater than or equal to one time slot. For example, a monitoring occasion interval corresponding to the first PDCCH monitoring mode includes M time slots, and M>0. It can also be considered that the first PDCCH monitoring mode is a slot based monitoring occasion mode, that is, the monitoring occasion interval is in units of time slots. In this case, the monitoring occasion interval of the UE is large, that is to say, the first PDCCH monitoring mode is not frequent monitoring, and it is generally considered that the UE is in Phase C in this case.

The monitoring result of the first PDCCH may include various situations, for example, the first PDCCH may or may not be detected. Further, when the first PDCCH is detected, the first PDCCH may or may not carry COT indication information, or may further carry DCI for data scheduling.

In act 302, ending time of monitoring the first PDCCH according to the first PDCCH monitoring mode is determined according to a monitoring result of the first PDCCH and first time information.

As an example, the first time information can be used for indicating the final ending time of monitoring the first PDCCH according to the first PDCCH monitoring mode. In addition, as for the specific ending time when the first PDCCH is monitored according to the first PDCCH monitoring mode, it can be determined by combining the monitoring result of the first PDCCH.

As an example, determining, according to the monitoring result of the first PDCCH and the first time information, the ending time of monitoring the first PDCCH according to the first PDCCH monitoring mode, includes: when the first time information is used for indicating a first moment, if channel occupation time (COT) indication information is not received on the first PDCCH when the first moment arrives, determining that the first moment is the ending time of monitoring the first PDCCH according to the first PDCCH monitoring mode.

That is to say, when the COT indication information has not been received on the first PDCCH before the first moment arrives, and the COT indication information has not been received on the first PDCCH when the first moment arrives, it means that the UE may have missed the monitoring or the access network device has not sent the COT indication information. In this case, the channel can be monitored by another PDCCH monitoring mode, and the current first PDCCH monitoring mode can be ended. In other words, it is determined that the first moment is the ending time of monitoring the first PDCCH according to the first PDCCH monitoring mode, thereby the first PDCCH monitoring mode is ended.

It should be noted that the first time information is only taken as example of indicating the first moment in the above. In another implementation, the first time information can also be used for indicating a period. In this case, if the COT indication information has not been received on the first PDCCH within the first period, it is determined that the end point of the period indicated by the first time information is the ending time of monitoring the first PDCCH.

As an example, a second PDCCH is monitored according to a second PDCCH monitoring mode after the ending time of monitoring the first PDCCH according to the first PDCCH monitoring mode.

Herein, the second PDCCH monitoring mode is different from the first PDCCH monitoring mode. As an example, the difference between the second PDCCH monitoring mode and the first PDCCH monitoring mode can be any of the following cases:

In the first case, the first PDCCH monitoring mode and the second PDCCH monitoring mode correspond to different search spaces.

In other words, the first PDCCH monitoring mode and the second PDCCH monitoring mode is used for monitoring in different search spaces or different CORESETs the search space or CORESET for monitoring in the first PDCCH monitoring mode is different from that in the second PDCCH monitoring mode, for example, the first PDCCH monitoring mode is used for monitoring in the first search space of the PDCCH, and the second PDCCH monitoring mode is used for monitoring in the second search space of the PDCCH.

In the second case, the first PDCCH monitoring mode and the second PDCCH monitoring mode correspond to different PDCCH monitoring periods in the same search space.

In this implementation, the first PDCCH monitoring mode and the second PDCCH monitoring mode can correspond to the same search space, but monitoring periods of the two monitoring modes are different, so that the first PDCCH monitoring mode is different from the second PDCCH monitoring mode.

As an example, a PDCCH monitoring period of a search space corresponding to the second PDCCH monitoring mode is less than one time slot. For example, a monitoring occasion interval corresponding to the second PDCCH monitoring mode includes N symbols, and 0<N<7. It can also be said that the second PDCCH monitoring mode is a mini-slot-based monitoring occasion mode, that is, the monitoring occasion interval is in units of symbols. In this case, the UE actually listens to the PDCCH in a frequent monitoring mode, and it can generally be considered that the UE is switched into Phase A.

In addition, the first PDCCH monitoring mode and the second PDCCH monitoring mode may be pre-configured to the UE by the access network device. As an example, the first PDCCH monitoring mode and the second PDCCH monitoring mode may be configured to the UE by the access network device after random access of the UE.

As an example, an implementation of monitoring the second PDCCH according to the second PDCCH monitoring mode may include the following: the UE monitors the second PDCCH using the second PDCCH monitoring mode at the boundary of the first time slot after the determined ending time, that is to say, the time of switching to the second PDCCH monitoring mode may be the boundary of the first time slot after the determined ending time, or in another word, the boundary of the earliest time slot after the determined ending time. The boundary of the first time slot after the ending time can be determined by the PDCCH monitoring occasion corresponding to the second PDCCH monitoring mode.

As an example, when receiving the COT indication information before the time indicated by the first time information arrives, the UE may determine, according to the COT indication information, the ending time of monitoring the first PDCCH according to the first PDCCH monitoring mode. Optionally, when receiving the COT indication information before the time indicated by the first time information arrives, the UE may also continue to determine, according to the time indicated by the first time information, the ending time of monitoring the first PDCCH according to the first PDCCH monitoring mode. This is not specifically limited in the implementation of the present disclosure.

In an implementation of the present disclosure, a first PDCCH is monitored according to a first PDCCH monitoring mode, and ending time of monitoring the first PDCCH according to the first PDCCH monitoring mode is determined according to a monitoring result of the first PDCCH and first time information. In other words, the switch of the PDCCH monitoring mode is determined according to the monitoring result and the first time information instead of relying solely on the COT indication information, so that the problem that UE cannot enter another channel receiving phase due to missing monitoring the COT indication information and other reasons can be avoided, and the probability of successful data transmission is improved.

Figure 4:
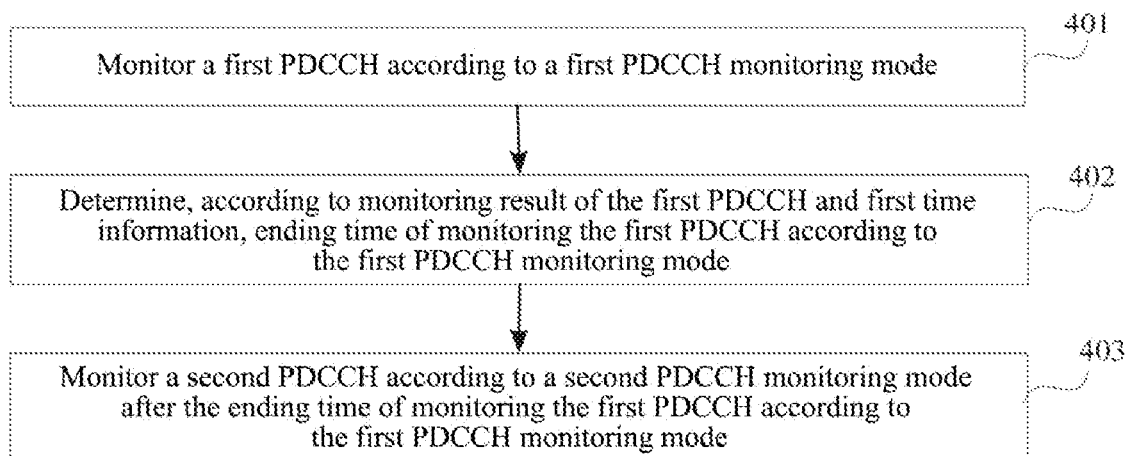
FIG. 4 is a flowchart of a data transmission method according to another exemplary implementation of the present disclosure.

Please refer to FIG. 4, which is a flow chart of a data transmission method according to another exemplary implementation. The data transmission method can be applied to the implementation environment shown in FIG. 1, and the data transmission method can include the following implementation acts: act 401 and act 402.

In act 401, a first PDCCH is monitored according to a first PDCCH monitoring mode.

As an example, a PDCCH monitoring period of a search space corresponding to the first PDCCH monitoring mode is greater than or equal to one time slot. For example, a monitoring occasion interval corresponding to the first PDCCH monitoring mode includes M time slots, and M>0. It can also be considered that the first PDCCH monitoring mode is a slot based monitoring occasion mode, that is, the monitoring occasion interval is in units of time slots. In this case, the monitoring occasion interval of the UE is large, that is to say, the second PDCCH monitoring mode is not of frequent monitoring. It is generally considered that the UE is in Phase C in this case, that is, the UE may need to be switched from Phase C to Phase A.

The monitoring result of the first PDCCH may include various situations, for example, the first PDCCH may or may not be detected. Optionally, when the first PDCCH is detected, the first PDCCH may or may not carry COT indication information, or may also carry DCI for data scheduling.

In act 402, ending time of monitoring the first PDCCH according to the first PDCCH monitoring mode is determined according to a monitoring result of the first PDCCH and first time information.

As an example, the first time information includes first period, and the first period is determined by received first configuration information or predefined.

When the first period is determined by the received first configuration information, the first configuration information may carry the first period, and the first configuration information is sent by the access network device. As an example, the first configuration information may be, but is not limited to, RRC (Radio Resource Control) signaling and broadcast information, which is not limited by the implementation of the present disclosure.

It should be noted that the above description only takes the first period determined by received first configuration information or predefined as an example. In another implementation, the first period can also be determined according to a preset rule, which is not limited by the implementation of the present disclosure.

As an example, a starting point of the first period is determined by target monitoring occasion for monitoring the first PDCCH according to the first PDCCH monitoring mode, wherein the first PDCCH carrying a common DCI is not detected or the first PDCCH carrying a target DCI is detected at the target monitoring occasion.

As an example, the common DCI includes COT indication information. In other words, the first PDCCH carrying common DCI being not detected by the UE at the target monitoring occasion includes the first PDCCH carrying the COT indication information being not detected by the UE at the target monitoring occasion. In this case, the starting point of the first period is determined according to the target monitoring occasion.

As an example, the target DCI includes a DCI for data scheduling, and the target DCI can also be called a UE-specific DCI and does not include COT indication information. In other words, the UE detecting the first PDCCH carrying the target DCI at the target monitoring occasion includes the UE detecting the first PDCCH carrying the DCI for data scheduling at the target monitoring occasion. In other words, the UE may detect the first PDCCH at the target monitoring occasion, but the first PDCCH carries the DCI for data scheduling. In this case, the starting point of the first period is determined according to the target monitoring occasion.

Exemplarily, the starting point of the first period is the ending time point of the symbol of the last control resource set of the target monitoring occasion indicated by the first PDCCH monitoring mode. For example, please refer to FIG. 5, the starting point of the first period is the moment A in FIG. 5.

As an example, the specific implementation of determining, according to the monitoring result of the first PDCCH and the first time information, the ending time of monitoring the first PDCCH according to the first PDCCH monitoring mode, may include: determining that the end point of the first period is the ending time of monitoring the first PDCCH according to the first PDCCH monitoring mode when the end point of the first period arrives, and the channel occupation time (COT) indication information has not been received on the first PDCCH.

Figure 5:
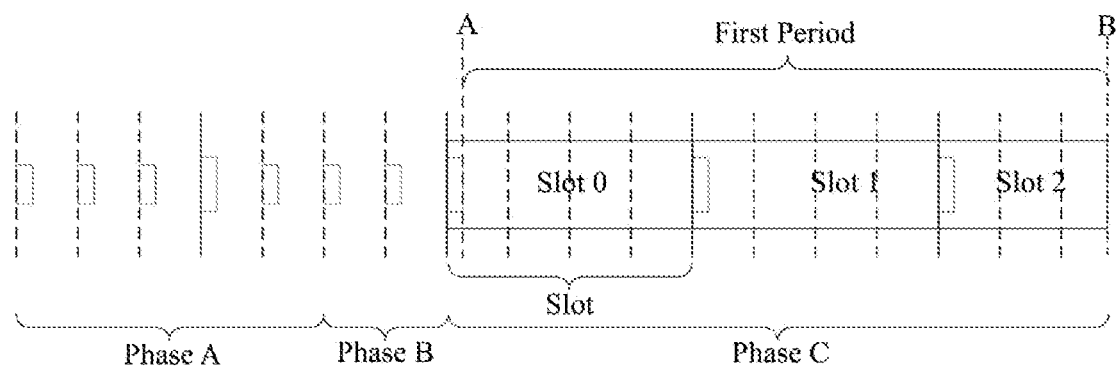
FIG. 5 is a schematic diagram of phases where UE receives a channel according to another exemplary implementation of the present disclosure.

For example, please refer to FIG. 5, from the starting point of the first period, the UE performs time counting, and the UE monitors the first PDCCH by using the first PDCCH monitoring mode when the counted time does not exceed the first period. The time counting operation can be terminated if COT indication information is detected or if a GC-PDCCH (Group Common PDCCH) carrying COT indication information is detected. In this case, the UE can determine, according to the COT indication information, the ending time of monitoring the first PDCCH according to the first PDCCH monitoring mode.

On the contrary, when the counted time reaches the first period and COT indication information has not been received in the first period, it means that the access network device may not successfully preempt the channel or the UE misses monitoring the first PDCCH. In this case, when the counted time reaches the first period, for example, when the moment B reaches the first period as referred in FIG. 5, the UE determines, under such a situation, that the end point of the first period is the ending time of monitoring the first PDCCH according to the first PDCCH monitoring mode.

In act 403, a second PDCCH is monitored according to a second PDCCH monitoring mode after the ending time of monitoring the first PDCCH according to the first PDCCH monitoring mode.

As an example, please refer to FIG. 5, the UE monitors the second PDCCH by the second PDCCH monitoring mode at the boundary of the first time slot after the first period. In other words, the timing of switching to the second PDCCH monitoring mode may be the boundary of the first time slot after the determined ending time, or the boundary of the earliest time slot after the determined ending time. The boundary of the first time slot after the first period can be determined by the second PDCCH monitoring occasion determined by the second PDCCH monitoring mode.

In an implementation of the present disclosure, a first PDCCH is monitored according to a first PDCCH monitoring mode, and ending time of monitoring the first PDCCH according to the first PDCCH monitoring mode is determined according to a monitoring result of the first PDCCH and first time information. In other words, the switch of the PDCCH monitoring mode is determined according to the monitoring result and the first time information instead of relying solely on the COT indication information, so that the problem that UE cannot enter another channel receiving phase due to missing monitoring the COT indication information and other reasons can be avoided, and the probability of successful data transmission is improved.

Figure 6:
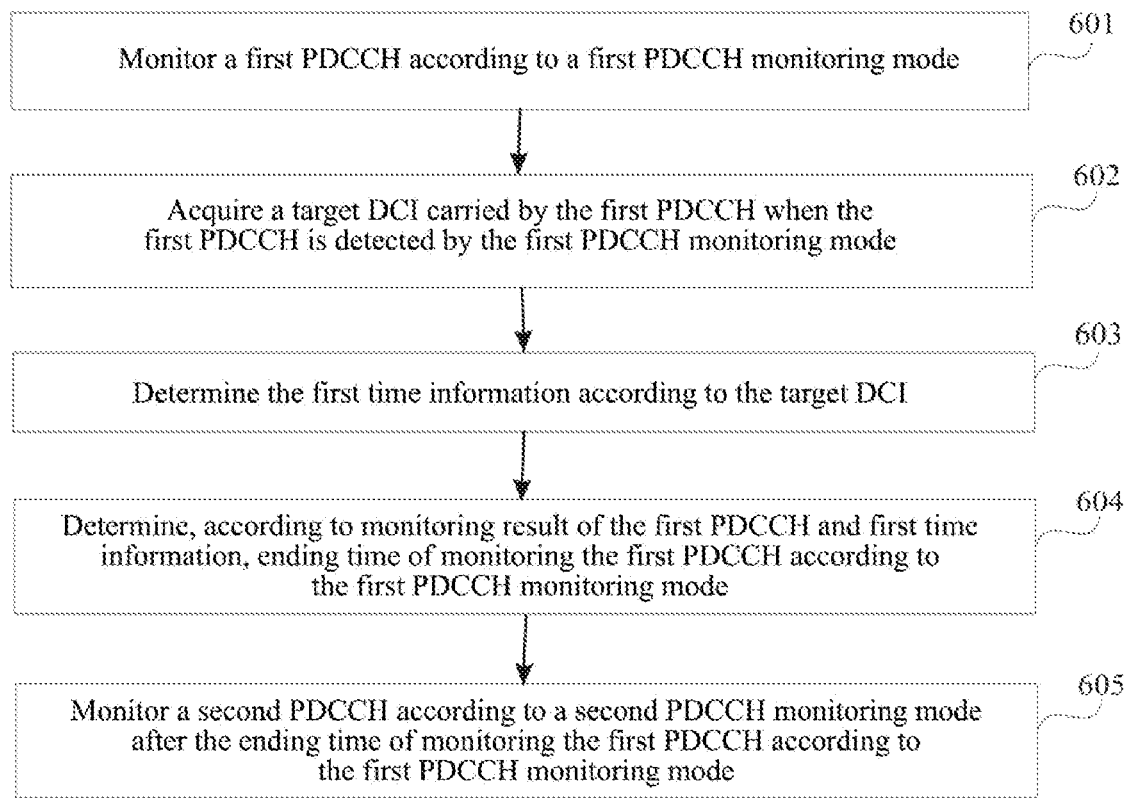
FIG. 6 is a flowchart of a data transmission method according to another exemplary implementation of the present disclosure.

Please refer to FIG. 6, which is a flow chart of a data transmission method according to another exemplary implementation. The data transmission method can be applied to the implementation environment shown in FIG. 1, and the data transmission method can include the following implementation acts.

In act 601, a first PDCCH is monitored according to a first PDCCH monitoring mode.

As an example, a PDCCH monitoring period of a search space corresponding to the first PDCCH monitoring mode is greater than or equal to one time slot. For example, a monitoring occasion interval corresponding to the first PDCCH monitoring mode includes M time slots, and M>0. It can also be considered that the first PDCCH monitoring mode is a slot based monitoring occasion mode, that is, the monitoring occasion interval is in units of time slots. In this case, the monitoring occasion interval of the UE is large, that is to say, the second PDCCH monitoring mode is not of frequent monitoring. It is generally considered that the UE is currently in Phase C in this case, that is, the UE may need to be switched from Phase C to Phase A.

The monitoring result of the first PDCCH may include various situations, for example, the first PDCCH may or may not be detected. Optionally, when the first PDCCH is detected, the first PDCCH may or may not carry COT indication information, or may also carry DCI for data scheduling.

In act 602, a target DCI carried by the first PDCCH is acquired when the first PDCCH is detected by the first PDCCH monitoring mode.

Here, the first time information can be determined through act 602 and act 603. First, when the UE detects that the first PDCCH carries the target DCI, it can acquire the target DCI.

In act 603, the first time information is determined according to the target DCI.

As an example, when the target DCI is used for data scheduling, the implementation of determining the first time information according to the target DCI may include: determining the first time information according to scheduling information, wherein the scheduling information is carried by the target DCI or determined by the received second configuration information.

That is, when the target DCI is used for data scheduling, the UE can acquire scheduling information to determine the first time information according to the scheduling information. As an example, the UE can obtain the scheduling information from the target DCI, that is, the scheduling information is carried by the target DCI, or it can also obtain the scheduling information from the received second configuration information, which can be the same as or different from the first configuration information. For example, the second configuration information can be higher layer signaling, that is, the scheduling information can also be pre-configured to the UE by the access network device through higher layer signaling. As an example, the higher layer signaling may be RRC signaling, etc.

Furthermore, since the target DCI may be scheduled by a PDSCH (physical downlink shared channel) or PUSCH (physical uplink shared channel), the specific implementation of determining the first time information according to the scheduling information may include the following possible implementations:

As an example, when the target DCI is scheduled by a PDSCH, a first parameter value indicating the number of time slots between a PDCCH and a PDSCH and a second parameter value indicating the number of time slots between a PDSCH and a physical uplink control channel (PUCCH) in the target DCI are acquired, and the first time information is determined according to the first parameter value and the second parameter value.

When the access network device schedules downlink data transmission through a target DCI of a downlink grant, the scheduling information carries a TDRA (Time Domain Resource Allocation) field, which is usually 4 bits and can carry configuration information indicating 16 different rows in a resource allocation table, wherein each row contains different resource allocation combinations. In addition, the scheduling information may also include a first parameter value for indicating the number of time slots between the PDCCH and PDSCH, which is generally expressed by K0. In addition, since the UE needs to feedback ACK (Acknowledgement)/NACK (Negative Acknowledgement) after receiving the PDSCH, the access network device usually further indicates the slot position and the PUCCH resource for transmitting the ACK/NACK corresponding to the PDSCH in the scheduling information, that is, the scheduling information also includes a second parameter value for indicating the number of time slots between the PDSCH and the PUCCH. For example, the second parameter value can be expressed as K1. For example, if the PDSCH is transmitted in time slot N, if the value of K1 is 4, it means that the corresponding feedback information ACK/NACK is transmitted in time slot n+4. Further, the configuration information of the PUCCH resource can be used for indicating a row in the predefined resource list, including time domain resources, frequency domain resources and spreading sequence resources of the PUCCH in a time slot (the spreading sequence resources exist for some PUCCH formats, but are not needed for some PUCCH formats).

In this way, the UE can obtain the first parameter value and the second parameter value, that is, K0 and K1, from the scheduling information, and then determine the first time information according to the K0 and K1.

As an example, the specific implementation of determining the first time information according to the first parameter value and the second parameter value may include determining the first time information by formula (1) based on the first parameter value and the second parameter value:

$$T2=K0+K1+1-S1-S2 \quad (1)$$

The above T2 is the first time information, S1 refers to the number of symbols occupied by a PDCCH time-frequency resource, and S2 refers to the number of symbols between the last symbol occupied by the PUCCH and the end position of a time slot.

Of course, the above implementation of determining the first time information according to the first parameter value and the second parameter value is only exemplary. In another implementation, the first time information can be determined according to the first parameter value and the second parameter value in other ways. For example, the first time information can also be determined according to the following formula (2) based on the first parameter value and the second parameter value:

$$T2=K0+K1+1 \quad (2)$$

It should be noted that the above description only takes the first parameter value and the second parameter value determined according to the scheduling information as an example. In another implementation, the first parameter value and the second parameter value may also be determined according to a predefined rule, which is not limited by the implementation of the present disclosure.

As an example, when the target DCI is scheduled by a PUSCH, a third parameter value used for indicating the number of offset time slots between a time slot where the target DCI is located and a time slot where PUSCH is located in the scheduling information is acquired, and the first time information is determined according to the third parameter value.

When the access network device schedules uplink data transmission using a target DCI of a uplink grant, the scheduling information carries a TDRA field, which is usually 4 bits and can carry configuration information indicating 16 different rows in a resource allocation table, wherein each row contains different resource allocation combinations. In addition, the scheduling information may also include a third parameter value for the number of offset time slots between a time slot where the target DCI is located and a time slot where PUSCH is located. The third parameter value is generally expressed by K2. In this way, the UE can obtain the third parameter value, that is, K2, from the scheduling information, and then determine the first time information according to K2.

As an example, the specific implementation of determining the first time information according to the third parameter value may include determining the first time information by formula (3) based on the third parameter value:

$$T2=K2+1-S1-S2 \quad (3)$$

The above T2 is the first time information, S1 refers to the number of symbols occupied by a PDCCH time-frequency resource, and S2 refers to the number of symbols between the last symbol occupied by the PUCCH and the end position of a time slot.

Of course, the above implementation of determining the first time information according to the third parameter value is only exemplary. In another implementation, the first time information can be determined according to the third parameter value in other ways. For example, the first time information can also be determined according to the following formula (4) based on the third parameter value:

$$T2=K2+1 \qquad (4)$$

Figure 7:
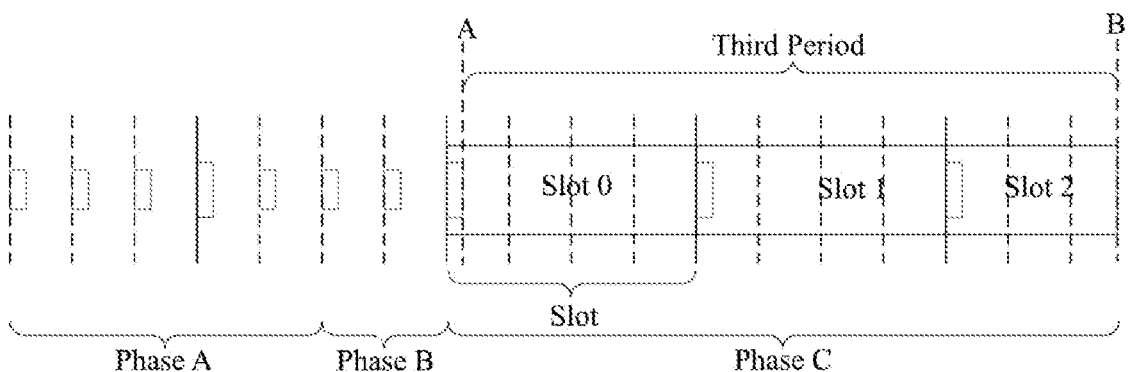
FIG. 7 is a schematic diagram of phases where UE receives a channel according to another exemplary implementation of the present disclosure.

As an example, when the first time information is used for indicating a third period, the starting point of the third period may be the ending time point of the last symbol of the control resource set of the first PDCCH. For example, as shown in FIG. 7, the starting point of the third period is time A in FIG. 7.

Figure 8:
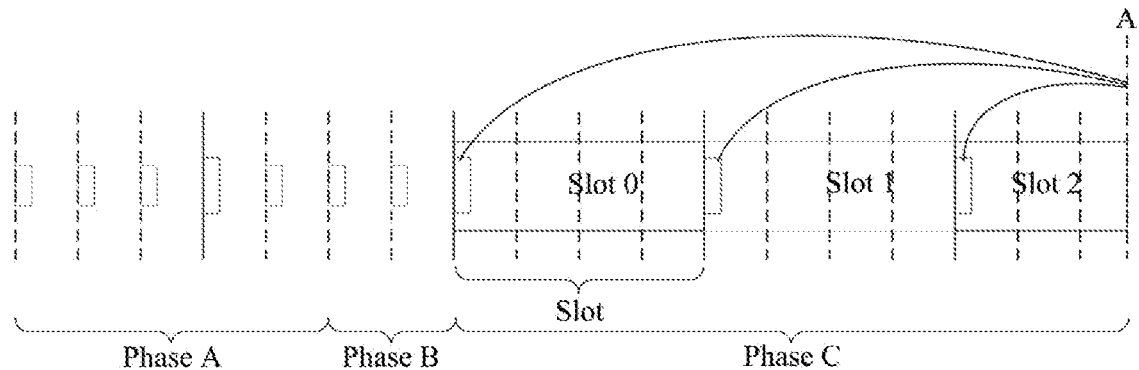
FIG. 8 is a schematic diagram of phases where UE receives a channel according to another exemplary implementation of the present disclosure.

As an example, when the first time information can also indicate a target moment, for example, please refer to FIG. 8, the target moment is moment A in FIG. 8.

In addition, it should be noted that the above description only takes the third parameter value determined according to the scheduling information as an example, and in another implementation, the third parameter value may also be determined according to a predefined rule.

In act 604, ending time of monitoring the first PDCCH according to the first PDCCH monitoring mode is determined according to a monitoring result of the first PDCCH and first time information.

As an example, the specific implementation of determining, according to the monitoring result of the first PDCCH and the first time information, the ending time of monitoring the first PDCCH according to the first PDCCH monitoring mode, may include: when the first time information is used for indicating a third period, determining that the end point of the third period is the ending time of monitoring the first PDCCH according to the first PDCCH monitoring mode if the end point of the third period arrives, and the channel occupation time (COT) indication information has not been received on the first PDCCH.

For example, please refer to FIG. 7, when the first time information is used for indicating the third period, from the starting point of the third period, the UE performs time counting, and before the counted time exceeds the third period, the UE monitors the first PDCCH by using the first PDCCH monitoring mode. If COT indication information is detected or if a GC-PDCCH (Group Common PDCCH) carrying COT indication information is detected, in this case, the UE can determine, according to the COT indication information, the ending time of monitoring the first PDCCH according to the first PDCCH monitoring mode. On the contrary, when the counted time reaches the third period and COT indication information has not been received in the third period, it means that the access network device may not successfully preempt the channel or the UE misses monitoring the first PDCCH. In this case, when the counted time reaches the third period, for example, when the moment B reaches the third period as referred in FIG. 7, the UE determines that the end point B of the third period is the ending time of monitoring the first PDCCH according to the first PDCCH monitoring mode.

As an example, the specific implementation of determining, according to the monitoring result of the first PDCCH and the first time information, the ending time of monitoring the first PDCCH according to the first PDCCH monitoring mode, may include: when the first time information is used for indicating a target moment, if channel occupation time (COT) indication information is not received on the first PDCCH when the target moment arrives, determining that the target moment is the ending time of monitoring the first PDCCH according to the first PDCCH monitoring mode.

For example, please refer to FIG. 8, when the first time information indicates a target moment, if COT indication information is detected before the target moment or if a GC-PDCCH carrying COT indication information is detected, then the UE can determine, according to the COT indication information, the ending time of monitoring the first PDCCH according to the first PDCCH monitoring mode. On the contrary, if the COT indication information is still not detected when the target moment arrives, it means that the access network device may not successfully preempt the channel or the UE misses monitoring the first PDCCH. In this case, when the target time such as moment A in FIG. 8 arrives, the UE determines that moment A in FIG. 8 is the ending time of monitoring the first PDCCH according to the first PDCCH monitoring mode.

In act 605, a second PDCCH is monitored according to a second PDCCH monitoring mode after the ending time of monitoring the first PDCCH according to the first PDCCH monitoring mode.

As an example, please refer to FIG. 7 or 8, the UE monitors the second PDCCH by the second PDCCH monitoring mode at the boundary of the first time slot after the first time information. In other words, the timing of switching to the second PDCCH monitoring mode may be the boundary of the first time slot after the determined ending time, or the boundary of the earliest time slot after the determined ending time. The boundary of the first time slot after the first period can be determined by the second PDCCH monitoring occasion determined by the second PDCCH monitoring mode.

In an implementation of the present disclosure, a first PDCCH is monitored according to a first PDCCH monitoring mode, and ending time of monitoring the first PDCCH according to the first PDCCH monitoring mode is determined according to a monitoring result of the first PDCCH and first time information. In other words, the switch of the PDCCH monitoring mode is determined according to the monitoring result and the first time information instead of relying solely on the COT indication information, so that the problem that UE cannot enter another channel receiving phase due to missing monitoring the COT indication information and other reasons can be avoided, and the probability of successful data transmission is improved.

Figure 9:
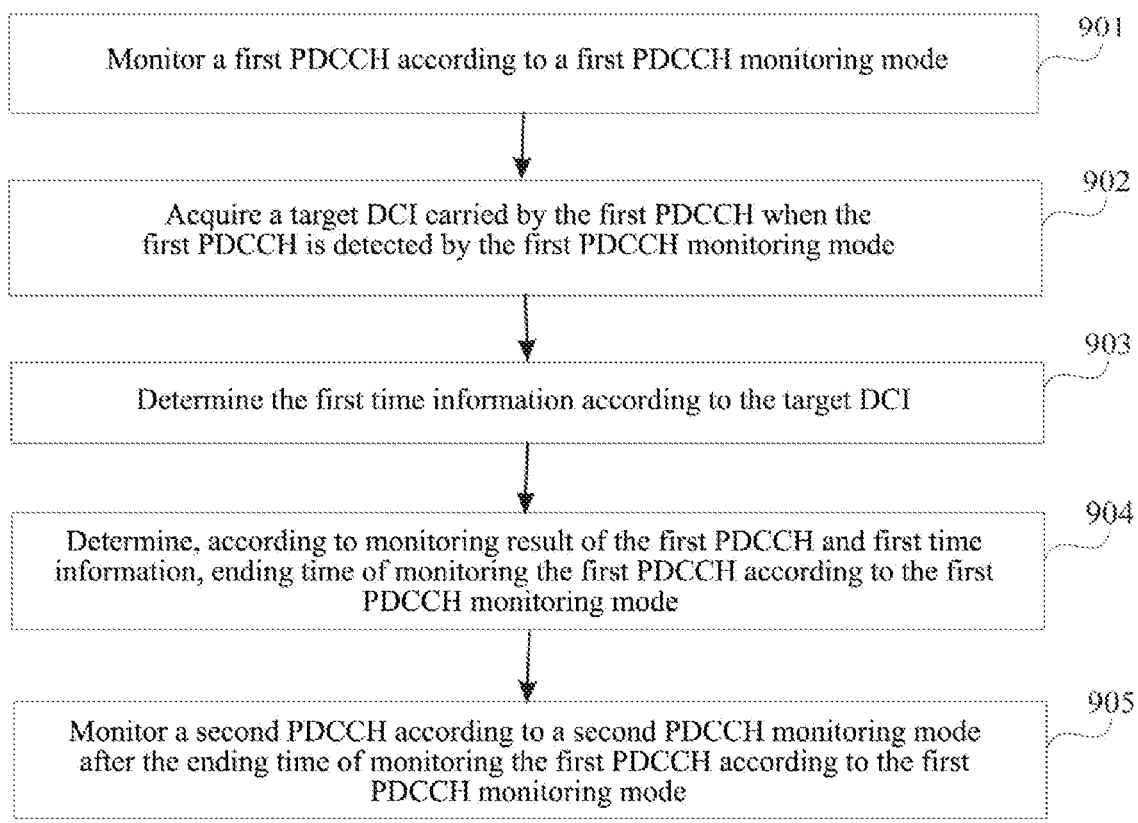
FIG. 9 is a flowchart of a data transmission method according to another exemplary implementation of the present disclosure.

Please refer to FIG. 9, which is a flow chart of a data transmission method according to another exemplary implementation. The data transmission method can be applied to the implementation environment shown in FIG. 1, and the data transmission method can include the following implementation acts.

In act 901, a first PDCCH is monitored according to a first PDCCH monitoring mode.

As an example, a PDCCH monitoring period of a search space corresponding to the first PDCCH monitoring mode is greater than or equal to one time slot. For example, a monitoring occasion interval corresponding to the first PDCCH monitoring mode includes M time slots, and M>0. It can also be considered that the first PDCCH monitoring mode is a slot based monitoring occasion mode, that is, the monitoring occasion interval is in units of time slots. In this case, the monitoring occasion interval of the UE is large, that is to say, the second PDCCH monitoring mode is not of frequent monitoring. It is generally considered that the UE is currently in Phase C in this case, that is, the UE may need to be switched from Phase C to Phase A.

The monitoring result of the first PDCCH may include various situations, for example, the first PDCCH may or may not be monitored. Optionally, when the first PDCCH is monitored, the first PDCCH may or may not carry COT indication information, or may also carry DCI for data scheduling.

In act 902, a target DCI carried by the first PDCCH is acquired when the first PDCCH is detected by the first PDCCH monitoring mode.

Here, the first time information can be determined through act 902 and act 903. First, when the UE detects that the first PDCCH carries the target DCI, it can acquire the target DCI.

In act 903, the first time information is determined according to the target DCI.

As an example, the first time information is determined according to indication information in the target DCI. In other words, compared with the existing communication system technology, the target DCI has added indication information for indicating the time slot offset between the time slot where the first PDCCH is located and the first time information, and the UE obtains the indication information. For example, assuming that the time slot where the first PDCCH is located is n and the indication information is 4, it can be determined that the first time information is n+4.

As an example, the indication information is second period, the second period is used for determining the first time information, and the second period is any one of at least one second period predefined.

In other words, the indication information can be directly period information, at least one period information can be predefined, and the indication information can include any one of at least one predefined period information.

In act 904, ending time of monitoring the first PDCCH according to the first PDCCH monitoring mode is determined according to a monitoring result of the first PDCCH and first time information.

As an example, the specific implementation of determining, according to the monitoring result of the first PDCCH and the first time information, the ending time of monitoring the first PDCCH according to the first PDCCH monitoring mode, may include: when the first time information is used for indicating a first moment, if channel occupation time (COT) indication information is not received on the first PDCCH when the first moment arrives, determining that the first moment is the ending time of monitoring the first PDCCH according to the first PDCCH monitoring mode.

If COT indication information is detected before the first moment arrives or if a GC-PDCCH carrying COT indication information is detected, then the UE can determine, according to the COT indication information, the ending time of monitoring the first PDCCH according to the first PDCCH monitoring mode. On the contrary, if the COT indication information is still not detected at the first moment, it means that the access network device may not successfully preempt the channel or the UE misses monitoring the first PDCCH. In this case, when the first time arrives, for example, refer to FIG. 8, the UE determines the first time (such as moment A) as the ending time of monitoring the first PDCCH according to the first PDCCH monitoring mode.

In act 905, a second PDCCH is monitored according to a second PDCCH monitoring mode after the ending time of monitoring the first PDCCH according to the first PDCCH monitoring mode.

As an example, please refer to FIG. 8, the UE monitors the second PDCCH by the second PDCCH monitoring mode at the boundary of the first time slot after the first time information. In other words, the timing of switching to the second PDCCH monitoring mode may be the boundary of the first time slot after the determined ending time, or the boundary of the earliest time slot after the determined ending time. The boundary of the first time slot after the first time information can be determined by the second PDCCH monitoring occasion determined by the second PDCCH monitoring mode.

In an implementation of the present disclosure, a first PDCCH is monitored according to a first PDCCH monitoring mode, and ending time of monitoring the first PDCCH according to the first PDCCH monitoring mode is determined according to a monitoring result of the first PDCCH and first time information. In other words, the switch of the PDCCH monitoring mode is determined according to the monitoring result and the first time information instead of relying solely on the COT indication information, so that the problem that UE cannot enter another channel receiving phase due to missing monitoring the COT indication information and other reasons can be avoided, and the probability of successful data transmission is improved.

Figure 10:
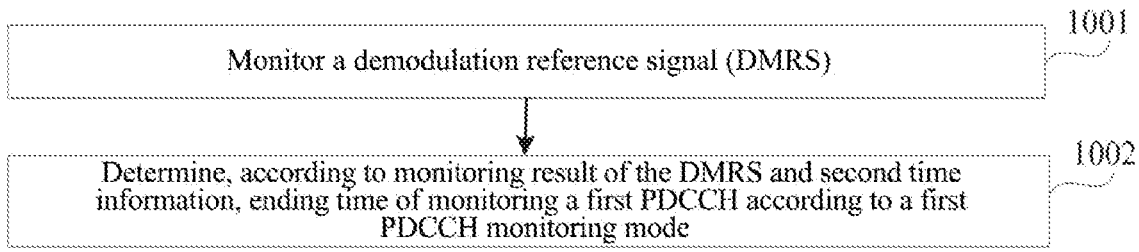
FIG. 10 is a flowchart of a data transmission method according to another exemplary implementation of the present disclosure.

Please refer to FIG. 10, which is a flow chart of a data transmission method according to an exemplary implementation. The data transmission method can be applied to the implementation environment shown in FIG. 1, and the data transmission method can include the following acts:

In act 1001, a demodulation reference signal (DMRS) is monitored.

UE can monitor a demodulation reference signal (DMRS) before monitoring a PDCCH. Exemplarily, the DMRS may be a broadband DMRS.

Furthermore, if the UE detects the DMRS, it means that it is currently in the COT, that is, the access network device successfully preempts the channel; otherwise, if the UE does not detect DMRS, it means that it is not currently in the COT.

In act 1002, according to the monitoring result of the DMRS and the second time information, the ending time of monitoring the first PDCCH according to the first PDCCH monitoring mode is determined.

Exemplarily, the second time information is determined by received third configuration information or predefined. Further, when the second time information is determined by the received third configuration information, and the third configuration information, such as RRC signaling, may be sent by the access network device. The third configuration information may be different from the first configuration information and the second configuration information, or may be the same as the first configuration information or the second configuration information.

As an example, the specific implementation of determining, according to the monitoring result of the DMRS and the second time information, the ending time of monitoring the first PDCCH according to the first PDCCH monitoring mode, may include: when the second time information is used for indicating a second moment, if the DMRS is detected, determining that the second moment is the ending time of monitoring the first PDCCH according to the first PDCCH monitoring mode.

It should be noted that the above description only takes the second time information used for indicating the second moment as an example. In another implementation, the second time information can also be used for indicating period. In this case, if the DMRS is detected within period indicated by the second time information, then it is determined that the end point of the period indicated by the second time information is the ending time of monitoring the first PDCCH according to the first PDCCH monitoring mode.

After the DMRS is detected, the second time information can be started accordingly. For example, when the second time information indicates period, the starting point of the period indicated by the second time information can be the symbol position where the DMRS is detected or its adjacent symbol position. Thereafter, the ending time of monitoring the first PDCCH according to the first PDCCH monitoring mode can be determined according to the second information.

Furthermore, after the ending time of monitoring the first PDCCH according to the first PDCCH monitoring mode, the DMRS is monitored according to the target monitoring mode.

In other words, after the ending time of monitoring the first PDCCH according to the first PDCCH monitoring mode, the UE can continue to monitor a DMRS according to the target monitoring mode instead of directly monitoring the second PDCCH according to the second PDCCH monitoring mode. Exemplarily, when the UE detects the DMRS according to the target monitoring mode, it can monitor the second PDCCH according to the second PDCCH monitoring mode, that is, it enter the Phase A.

In the implementation of the present disclosure, the DMRS is monitored, and the ending time of monitoring the first PDCCH according to the first PDCCH monitoring mode is determined according to the monitoring result of the DMRS and the second time information. In other words, the switch of the PDCCH monitoring mode is determined according to the monitoring result of the DMRS and the second time information instead of relying solely on the COT indication information, so that the problem that UE cannot enter another channel receiving phase due to missing monitoring the COT indication information and other reasons can be avoided, and the probability of successful data transmission is improved.

Figure 11:
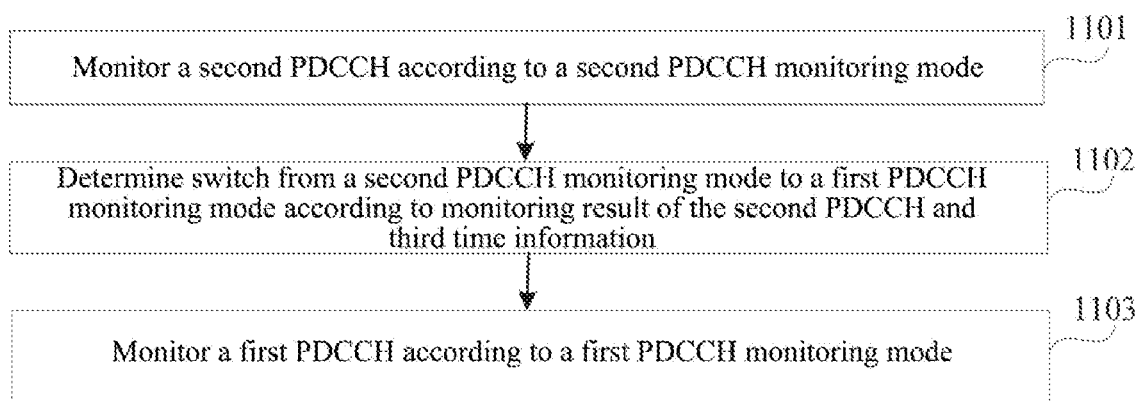
FIG. 11 is a flowchart of a data transmission method according to another exemplary implementation of the present disclosure.

Please refer to FIG. 11, which is a flow chart of a data transmission method according to another exemplary implementation. The data transmission method can be applied to the implementation environment shown in FIG. 1, and the data transmission method can include the following implementation acts:

In act 1101, a second PDCCH is monitored according to a second PDCCH monitoring mode.

In this case, when the monitoring occasion interval of the second PDCCH monitoring mode is smaller than that of the first PDCCH monitoring mode, it is generally considered that the UE is currently in Phase A and needs to be switched from Phase A to Phase C.

In act 1102, switch from a second PDCCH monitoring mode to a first PDCCH monitoring mode is determined according to a monitoring result of the second PDCCH and third time information.

In order to avoid that UE is always in Phase A and cannot enter Phase C due to missing monitoring COT indication information, the third time information can be set.

Exemplary, if the COT indication information is not received on the second PDCCH within the time indicated by the third time information, the current second PDCCH monitoring mode is switched to the first PDCCH monitoring mode, and the second PDCCH monitoring mode is different from the first PDCCH monitoring mode.

As an example, the third time information may be determined by received fourth configuration information or predefined. Further, the fourth configuration information is sent by the access network device, and the fourth configuration information may be, but is not limited to, RRC signaling and broadcast information, which is not limited by the implementation of the present disclosure.

The fourth configuration information may be different from the first configuration information, the second configuration information and the third configuration information, or the fourth configuration information may be the same as the first configuration information, the second configuration information or the third configuration information, which is not limited by the implementation of the present disclosure.

It should be noted that the above description is only based on the example where the third time information is determined by the received fourth configuration information or predefined. In another implementation, the third time information can also be determined according to a preset rule, which is not limited by the implementation of the present disclosure.

As an example, the starting point of the period indicated by the third time information is the starting time of monitoring the second PDCCH by the second PDCCH monitoring mode. For example, please refer to FIG. 12, and the starting point of the period indicated by the third time information is moment A in FIG. 12.

The UE performs time counting from the starting point of the period indicated by the third time information, and if the counted time does not exceed the period indicated by the third time information, the UE monitors the second PDCCH in the second PDCCH monitoring mode. If the COT indication information is detected, the time counting operation can be terminated. In this case, the UE can be switched from Phase A to Phase C according to the COT indication information, so the subsequent switching of the channel receiving mode can be stopped according to the period indicated by the third time information.

On the contrary, when the counted time reaches the period indicated by the third time information and the COT indication information has not been received within this period, it means that the access network device may not successfully preempt the channel, or the UE missed monitoring the second PDCCH. In this case, when the counted time reaches the period, such as moment B in FIG. 12, the UE is switched from the current second PDCCH monitoring mode to the first PDCCH monitoring mode, that is, from Phase A to Phase C.

It is worth mentioning that, on the one hand, when the access network device does not preempt the channel for a long time, the UE can reduce the PDCCH monitoring frequency, thereby saving the power consumption of the UE; On the other hand, the problem that the behavior of the UE receiving the PDCCH cannot be changed correspondingly due to missing monitoring the PDCCH can also be avoided, that is, it can be avoided that UE always monitors the second PDCCH according to the second PDCCH monitoring mode.

In act 1103, a first PDCCH is monitored by the first PDCCH monitoring mode.

Figure 12:
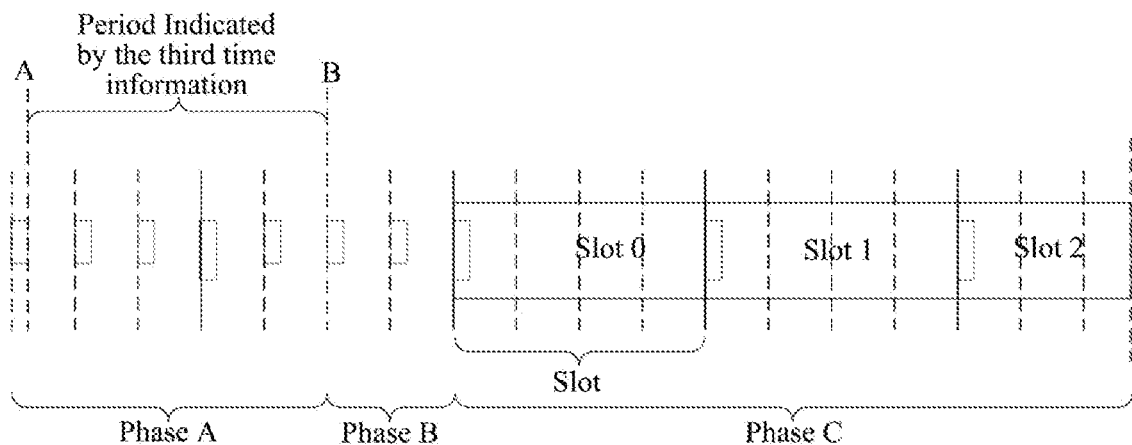
FIG. 12 is a schematic diagram of phases where UE receives a channel according to another exemplary implementation of the present disclosure.

As an example, please refer to FIG. 12, the UE monitors a PDCCH using the first PDCCH monitoring mode at the boundary of the first time slot after the period indicated by the third time information, that is, the timing of switching to the first PDCCH monitoring mode can be the boundary of the first time slot after a predetermined time, or the boundary of the earliest time slot after the predetermined time. The boundary of the first time slot after the period indicated by the third time information is the PDCCH monitoring occasion determined by the first PDCCH monitoring mode.

In the implementation of the present disclosure, when the COT indication information on the second PDCCH is not detected within the time indicated by the third time information, the UE no longer adopts the current second PDCCH monitoring mode for monitoring, but is switched to the first PDCCH monitoring mode for monitoring, so as to avoid that the UE cannot enter another channel receiving phase due to reasons such as missing monitoring the COT indication information, so that the data can be successfully transmitted.

Figure 13:
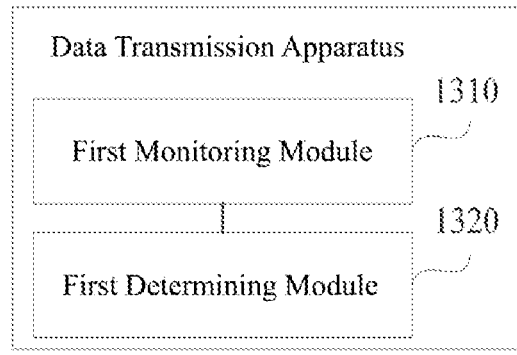
FIG. 13 is a schematic structural diagram of an apparatus of data transmission according to an exemplary implementation of the present disclosure.

FIG. 13 is a schematic structural diagram of an apparatus for data transmission according to an exemplary implementation. The apparatus can be configured in UE, and the UE can include: a first monitoring module 1310 and a first determining module 1320.

The first monitoring module 1310 is configured to monitor a first physical downlink control channel (PDCCH) according to a first PDCCH monitoring mode.

The first determining module 1320 is configured to determine, according to a monitoring result of the first PDCCH and first time information, ending time of monitoring the first PDCCH according to the first PDCCH monitoring mode.

In a possible implementation of the present disclosure, the first time information includes first period, and the first period is determined by received first configuration information or predefined.

In a possible implementation of the present disclosure, a starting point of the first period is determined by target monitoring occasion for monitoring the first PDCCH according to the first PDCCH monitoring mode, wherein the first PDCCH carrying a common DCI is not detected or the first PDCCH carrying a target DCI is detected at the target monitoring occasion.

In a possible implementation of the present disclosure, the first determining module 1320 is further configured to acquire a target DCI carried by the first PDCCH when the first PDCCH is detected by the first PDCCH monitoring mode; and determine the first time information according to the target DCI.

In a possible implementation of the present disclosure, the first determining module 1320 is configured to determine the first time information according to scheduling information when the target DCI is used for scheduling data, wherein the scheduling information is carried by the target DCI or determined by the received second configuration information.

In a possible implementation of the present disclosure, the first determining module 1320 is configured to, when the target DCI is used for scheduling a physical downlink shared channel (PDSCH), acquire a first parameter value indicating the number of time slots between a PDCCH and a PDSCH and a second parameter value indicating the number of time slots between a PDSCH and a physical uplink control channel (PUCCH) in the scheduling information; and determine the first time information according to the first parameter value and the second parameter value.

In a possible implementation of the present disclosure, the first determining module 1320 is configured to, when the target DCI is used for scheduling a physical uplink shared channel (PUSCH), acquire a third parameter value used for indicating the number of offset time slots between a time slot where the target DCI is located and a time slot where PUSCH is located in the scheduling information; and determine the first time information according to the third parameter value.

In a possible implementation of the present disclosure, the first determining module 1320 is configured to determine the first time information according to indication information in the target DCI.

In a possible implementation of the present disclosure, the indication information is second period, the second period is used for determining the first time information, and the second period is any one of at least one second period predefined.

In a possible implementation of the present disclosure, the first determining module 1320 is configured to: when the first time information is used for indicating a first moment, if channel occupation time (COT) indication information is not received on the first PDCCH when the first moment arrives, determine that the first moment is the ending time of monitoring the first PDCCH according to the first PDCCH monitoring mode.

In a possible implementation of the present disclosure, the first monitoring module 1310 is further configured to: monitor a second PDCCH according to a second PDCCH monitoring mode after the ending time of monitoring the first PDCCH according to the first PDCCH monitoring mode.

In an implementation of the present disclosure, a first PDCCH is monitored according to a first PDCCH monitoring mode, and ending time of monitoring the first PDCCH according to the first PDCCH monitoring mode is determined according to a monitoring result of the first PDCCH and first time information. In other words, the switch of the PDCCH monitoring mode is determined according to the monitoring result and the first time information instead of relying solely on the COT indication information, so that the problem that UE cannot enter another channel receiving phase due to missing monitoring the COT indication information and other reasons can be avoided, and the probability of successful data transmission is improved.

Figure 14:
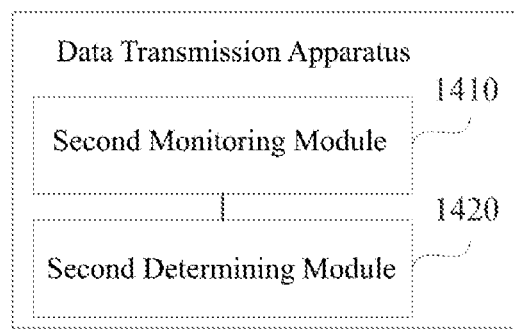
FIG. 14 is a schematic structural diagram of an apparatus of data transmission according to an exemplary implementation of the present disclosure.

FIG. 14 is a schematic structural diagram of an apparatus for data transmission according to an exemplary implementation. The apparatus can be configured in UE, and the UE can include: a second monitoring module 1410 and a second determining module 1420.

The second monitoring module 1410 is configured to monitor a demodulation reference signal (DMRS).

The second determining module 1420 is configured to determine, according to a monitoring result of the DMRS and second time information, ending time of monitoring a first PDCCH according to a first PDCCH monitoring mode.

In a possible implementation of the present disclosure, the second time information is determined by received third configuration information or predefined.

In a possible implementation of the present disclosure, the second determining module 1420 is configured to: when the second time information is used for indicating a second moment, if the DMRS is detected, determine that the second moment is the ending time of monitoring the first PDCCH according to the first PDCCH monitoring mode.

In a possible implementation of the present disclosure, the second monitoring module 1410 is further configured to: monitor a DMRS according to a target monitoring mode after the ending time of monitoring the first PDCCH according to the first PDCCH monitoring mode.

In this implementation, the DMRS is monitored, and the ending time of monitoring the first PDCCH according to the first PDCCH monitoring mode is determined according to the monitoring result of the DMRS and the second time information. In other words, the switch of the PDCCH monitoring mode is determined according to the monitoring result of the DMRS and the second time information instead of relying solely on the COT indication information, so that the problem that UE cannot enter another channel receiving phase due to missing monitoring the COT indication information and other reasons can be avoided, and the probability of successful data transmission is improved.

Figure 15:
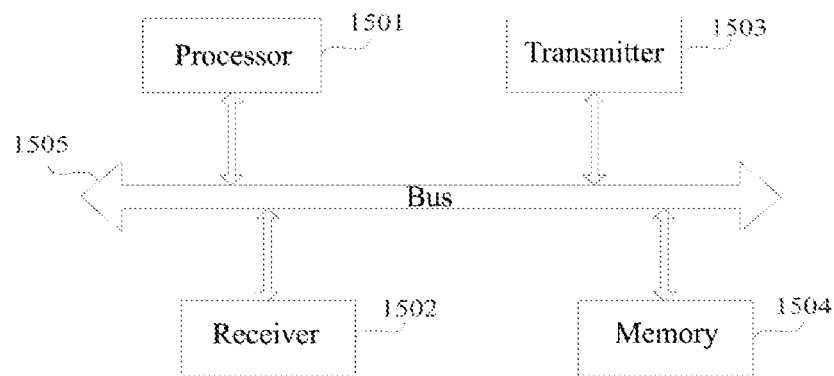
FIG. 15 is a schematic structural diagram of a device according to another exemplary implementation of the present disclosure.

Referring to FIG. 15, FIG. 15 is a schematic structural diagram of UE according to an exemplary implementation of the present disclosure. The UE includes a processor 1501, a receiver 1502, a transmitter 1503, a memory 1504 and a bus 1505.

The processor 1501 includes one or more processing cores. The processor 1501 performs various functional applications and information processing by running software programs and modules.

The receiver 1502 and the transmitter 1503 can be implemented as a communication component, which can be a communication chip.

The memory 1504 is connected to the processor 1501 via the bus 1505.

The memory 1504 may be configured to store at least one instruction, and the processor 1501 is configured to execute the at least one instruction, so as to implement various acts executed by the UE in various method implementations described above.

In addition, the memory 1504 may be implemented by any type of transitory or non-transitory storage device or a combination thereof. The transitory or non-transitory storage device may include, but not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, and a programmable read only memory (PROM).

The present disclosure provides a computer-readable storage medium, the storage medium stores at least one instruction, and the at least one instruction is loaded and executed by the processor to implement the data transmission method provided by various method implementations described above.

The present disclosure also provides a computer program product. The computer program product, when running on a computer, causes the computer to execute the data transmission method provided by various method implementations described above.

One of ordinary skilled in the art may understand that all or part of the acts for implementing the implementations may be completed using hardware, or related hardware may be instructed by programs, which may be stored in a computer-readable storage medium, which may be a read-only memory, a magnetic disk, or an optical disk, etc.

The above description is only the preferred implementations of the present disclosure, and is not intended to limit the present disclosure. Any modification, equivalent substitution, improvement, etc., made within the spirit and principles of the present disclosure shall be included in the scope of protection of the present disclosure.

What is claimed is:

1. A method for data transmission, applied to user equipment (UE), comprising:
   monitoring a first Physical Downlink Control Channel (PDCCH) according to a first PDCCH monitoring mode;
   determining first time information according to scheduling information, wherein the scheduling information is carried by a target Downlink Control Information (DCI) or determined by a second configuration information;
   determining, according to a monitoring result of the first PDCCH and first time information, an ending time of monitoring the first PDCCH according to the first PDCCH monitoring mode;
   monitoring a second PDCCH according to a second PDCCH monitoring mode after the ending time.

2. The method according to claim 1, wherein before determining first time information according to scheduling information, the method further comprises:
   the target DCI is carried by the first PDCCH, and used for data scheduling.

3. The method according to claim 1, wherein the second PDCCH is monitored through the second PDCCH monitoring mode at a boundary of a first time slot after the first time information.

4. The method according to claim 1, wherein the method further comprises:
   determining, according to a monitoring result of the second PDCCH and third time information, to switch from the second PDCCH monitoring mode to the first PDCCH monitoring mode.

5. The method according to claim 4, wherein a starting point of a period indicated by the third time information is starting time of monitoring the second PDCCH through the second PDCCH monitoring mode.

6. The method according to claim 4, wherein the first PDCCH is monitored through the first PDCCH monitoring mode at a boundary of a first time slot after a period indicated by the third time information.

7. The method according to claim 6, wherein the boundary of the first time slot after the period indicated by the third time information is a PDCCH monitoring occasion determined through the first PDCCH monitoring mode.

8. The method according to claim 4, wherein the third time information is determined by a fourth configuration information.

9. The method according to claim 8, wherein the fourth configuration information is a radio resource control (RRC) signaling.

10. A device, comprising a processor, a receiver, a transmitter, a memory and a bus, wherein the receiver and the transmitter are implemented as a communication component, the memory is connected to the processor via the bus and is configured to store at least one instruction, and the processor is configured to execute the at least one instruction to:
    monitor a first Physical Downlink Control Channel (PDCCH) according to a first PDCCH monitoring mode;
    determine first time information according to scheduling information, wherein the scheduling information is carried by a target Downlink Control Information (DCI) or determined by a second configuration information;
    determine, according to a monitoring result of the first PDCCH and first time information, an ending time of monitoring the first PDCCH according to the first PDCCH monitoring mode;
    monitor a second PDCCH according to a second PDCCH monitoring mode after the ending time.

11. The device according to claim 10, wherein the target DCI is carried by the first PDCCH, and used for data scheduling.

12. The device according to claim 10, wherein the second PDCCH is monitored through the second PDCCH monitoring mode at a boundary of a first time slot after the first time information.

13. The device according to claim 10, wherein the processor is further configured to execute the at least one instruction to:

determine, according to a monitoring result of the second PDCCH and third time information, to switch from the second PDCCH monitoring mode to the first PDCCH monitoring mode.

14. The device according to claim 13, wherein a starting point of a period indicated by the third time information is starting time of monitoring the second PDCCH through the second PDCCH monitoring mode.

15. The device according to claim 13, wherein the first PDCCH is monitored by the first PDCCH monitoring mode at a boundary of a first time slot after a period indicated by the third time information.

16. The device according to claim 15, wherein the boundary of the first time slot after the period indicated by the third time information is a PDCCH monitoring occasion determined through the first PDCCH monitoring mode.

17. A non-transitory computer-readable storage medium, wherein the computer-readable storage medium stores an instruction, when executed by a processor, enabling the processor to:
  monitor a first Physical Downlink Control Channel (PDCCH) according to a first PDCCH monitoring mode;
  determine first time information according to scheduling information, wherein the scheduling information is carried by a target Downlink Control Information (DCI) or determined by a second configuration information;
  determine, according to a monitoring result of the first PDCCH and first time information, an ending time of monitoring the first PDCCH according to the first PDCCH monitoring mode;
  monitor a second PDCCH according to a second PDCCH monitoring mode after the ending time.

18. The non-transitory computer-readable storage medium according to claim 17, wherein the second PDCCH is monitored through the second PDCCH monitoring mode at a boundary of a first time slot after the first time information.

19. The non-transitory computer-readable storage medium according to claim 17, wherein the computer-readable storage medium stores an instruction, when executed by a processor, further enabling the processor to:
  determine, according to a monitoring result of the second PDCCH and third time information, to switch from the second PDCCH monitoring mode to the first PDCCH monitoring mode.

20. The non-transitory computer-readable storage medium according to claim 19, wherein a starting point of a period indicated by the third time information is starting time of monitoring the second PDCCH through the second PDCCH monitoring mode.

* * * * *